United States Patent [19]

Bennett

[11] 4,090,670
[45] May 23, 1978

[54] METHOD AND APPARATUS FOR THE RECOVERY OF VULCANIZED ELASTOMERIC MATERIAL

[75] Inventor: William Douglas Bennett, Brownhills, England

[73] Assignee: Dunlop Limited, London, England

[21] Appl. No.: 732,862

[22] Filed: Oct. 15, 1976

[30] Foreign Application Priority Data

Oct. 8, 1975 United Kingdom ............... 41173/75

[51] Int. Cl.$^2$ ........................................... B02C 21/00
[52] U.S. Cl. ....................................... 241/23; 241/30; 241/DIG. 31; 157/13; 260/2.3; 260/720
[58] Field of Search ............... 241/3, 23, 30, DIG. 31; 157/13; 260/2.3, 710, 720; 82/101

[56] References Cited

U.S. PATENT DOCUMENTS

| 1,963,943 | 6/1934 | Gross | 241/DIG. 31 |
| 2,494,593 | 1/1950 | Suerdrup | 260/720 |
| 2,543,315 | 2/1951 | Fabregat | 260/720 |
| 2,996,109 | 8/1961 | MacMillan | 157/13 |
| 3,364,526 | 1/1968 | Varady et al. | 157/13 |
| 3,721,392 | 3/1973 | Burwell | 241/DIG. 31 |

FOREIGN PATENT DOCUMENTS 573,053  11/1945  United Kingdom.

Primary Examiner—Granville Y. Custer, Jr.
Attorney, Agent, or Firm—Stevens, Davis, Miller & Mosher

[57] ABSTRACT

Rubber is recovered for re-use e.g. from scrap pneumatic tires by briefly raising a surface of the tire to a high temperature and then rasping the heat-treated surface. Tires reinforced either with a textile or a steel ply can first be parted on opposite sides of the breaker structure. A machine is provided which accepts pieces of vulcanized material and progressively reduces them to heat-treated particles by repetitively heating a surface of each piece and attacking it with a rasping tool.

18 Claims, 9 Drawing Figures

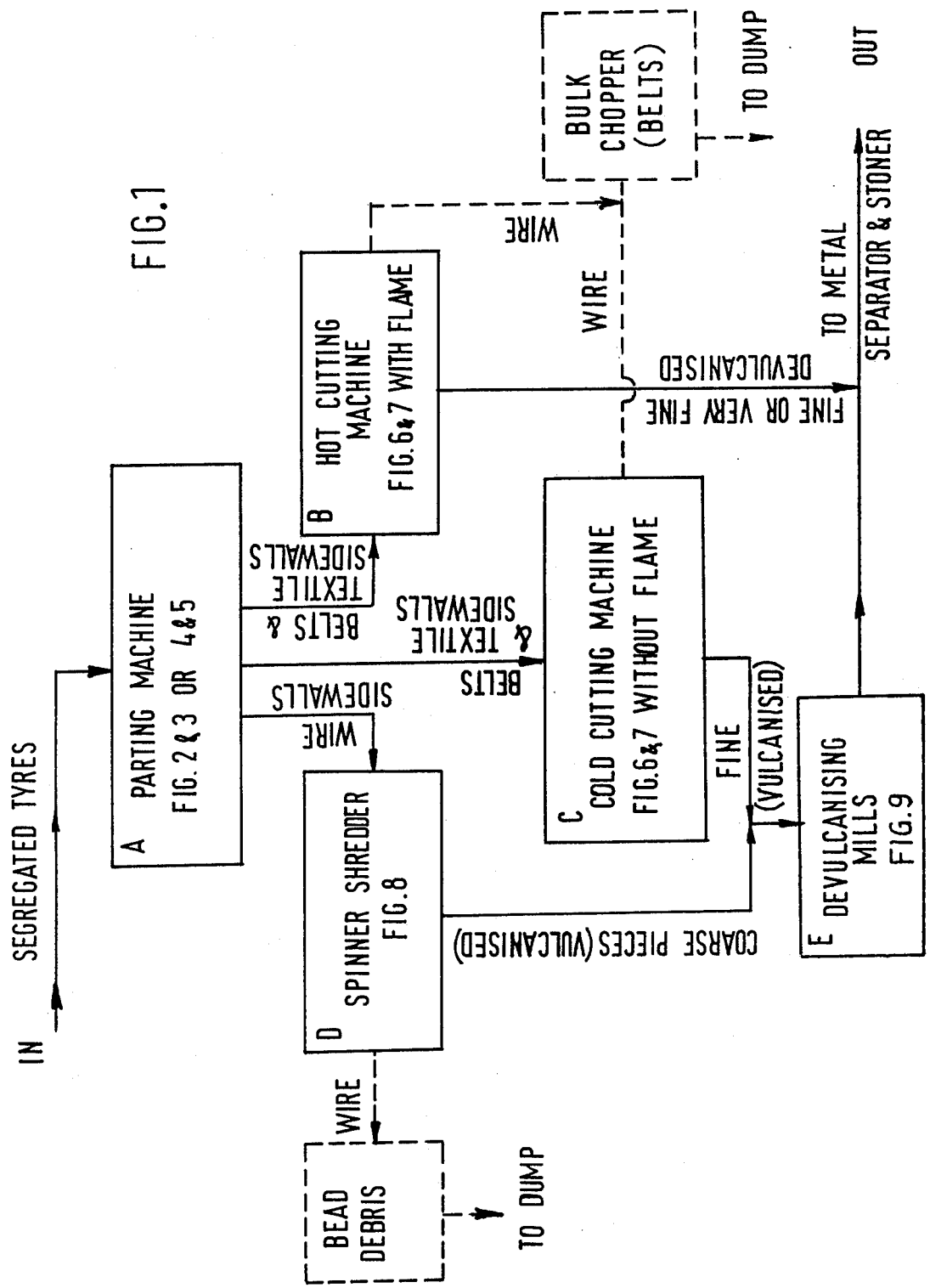

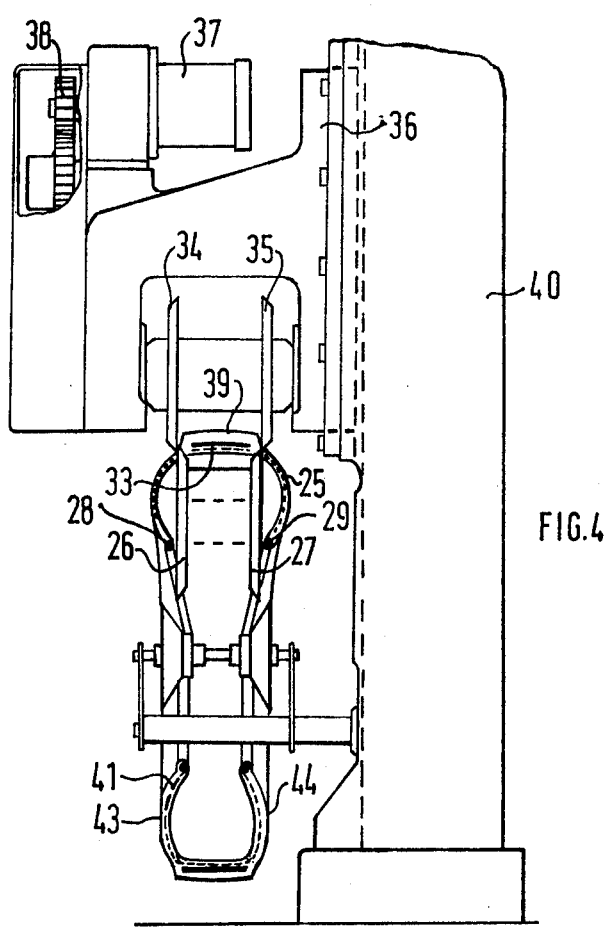
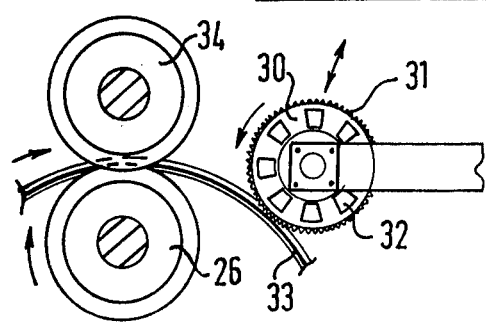
FIG.4
FIG.5

METHOD AND APPARATUS FOR THE RECOVERY OF VULCANIZED ELASTOMERIC MATERIAL

This invention relates to an improved method and apparatus for the recovery of vulcanised elastomeric material, particularly the recovery of such material from scrap pneumatic tyres.

In accordance with one aspect of the present invention there is provided a method for the recovery for re-use of vulcanised elastomeric material from a surface of an article comprising said material, the method comprising briefly raising said surface to a high temperature and subsequently removing heat-treated elastomeric material from said surface.

The said surface is preferably raised to a temperature in the range 2000°–3000° C. for a period of less than ½ a second, and preferably a temperature of approximately 2500° C. for a period of approximately one-tenth of a second. This may be achieved by relatively moving the surface and the source of heat at a speed in the range 120–130 feet per minute.

Separation of the heat-treated elastomeric material is preferably achieved by a tool which has a chopping or rasping action on the heat-treated surface so as to obtain therefrom discrete shreds or particles each at least mainly consisting of heat-treated elastomeric material and these are preferably sufficiently small in size to ensure that at least the greater part of each shred or particle has been subjected to the de-vulcanising effect of the heat treatment. Where shreds or paticles larger than this are initially obtained these may be again heat-treated and severed as many times as necessary to obtain fine enough shreds or particles.

In the recovery of natural or synthetic rubber from scrap pneumatic tyres a tyre may be supported for rotation about its axis while a flame is played upon it from a fixed position, the speed of rotation of the tyre determining the period during which natural or synthetic rubber on the surface of the tyre is exposed to the flame. Preferably the flame is narrow, being produced from a nozzle, e.g. of an oxypropane burner, which is elongated axially of the tyre and with such an arrangement by rotating a tyre of average diameter at speeds of up to 20 revolutions per minute a given point on the surface of the tyre tread portion will pass the flame at a speed of 120–130 feet per minute so as to be exposed to the flame for approximately one-tenth of a second. Subsequent to exposure to the flame the heat-treated surface of the tyre is subjected to the action of the pins or teeth on the periphery of a cylindrical tool rotated about an axis parallel with the tyre axis. This tool may be a pin rasp or it may take the form of a cutter resembling an axially elongated circular saw with saw-tooth-shaped teeth designed to have a chopping action on the tyre.

Before subjecting the tyre to the above procedures it may be desired to separate the tread portion from the sidewalls of the tyre. This will enable the tread portion and sidewalls to be dealt with separately in such a way that a greater portion of the vulcanised material of the sidewalls can be recovered. In the case of a tyre with textile-reinforced sidewalls each sidewall disc may be supported and rotated in its own plane while subjecting the disc at the periphery to the action of a flame or flames which move progressively from the outer toward the inner periphery of the disc. Following flame treatment the disc periphery is attacked by a cutting tool which progressively "nibbles", chops or shreds the whole disc from its outer toward its inner periphery, until finally only the vulcanised material and textile reinforcement immediately adjacent the wire bead reinforcement remains.

In this process the textile reinforcement of the sidewall is burnt and remains in the de-vulcanised particles of elastomeric material obtained only as a carbon residue or soot which can be tolerated.

Wire-reinforced tyres are not recoverable by conventional mechanical reclaim plant because the wire will do too much damage to the machinery. By subjecting a wire-reinforced tyre to the recovery technique of the present invention at least the greater proportion of the elastomeric material of the tread portion of the tyre can be recovered without the necessity of contacting the wire with any tool. If the tyre is of the kind which has a wire breaker structure but textile plies in the sidewalls, the above parting technique can be employed, the tyre being cut on opposite sides of the breaker structure by cutting tools which thus do not contact the wire, after which the textile-reinforced sidewalls can be recovered as above. In the case of a tyre with a wire ply in its sidewalls the tyre can be cut on opposite sides of the breaker structure through the wire ply, and then the bead reinforcement of each sidewall disc can be held while the elastomeric component of the disc is pulled radially off the severed ends of the wire ply.

The tread band of a parted tyre can be internally supported by its integral breaker structure while it is rotated and its radially outer surface is subjected successively to flame treatment and cutting or rasping in a manner analogous to the treatment of a whole tyre already described.

It will be seen that the various procedures above described will result in particles or pieces of elastomeric material in a range of sizes and in different stages of de-vulcanisation. For example the pulling off of elastomeric material from the severed wire plies of a parted, wire-reinforced sidewall will result in relatively large pieces subjected to no de-vulcanisation. Particles obtained by "nibbling" a fabric-reinforced sidewall disc from its outer periphery may be of a different size and quality from particles obtained from the tread-band and will contain a greater proportion of fabric residue. Furthermore, heat treatment may be omitted altogether in the above-described preliminary procedures, the tyre or the separated tread band and sidewall discs being subjected only to the action of rasping or chopping tools to produce particulate elastomeric material of random size and varying quality.

There is therefore provided in accordance with another aspect of the present invention a machine designed to accept such miscellaneous elastomeric material and to produce therefrom a more uniform de-vulcanised particulate elastomeric material. This takes the form of means for repeatedly chopping or severing pieces or particles introduced into the machine so as progressively to reduce their size, and means for briefly subjecting each piece or particle to intense heat between successive chopping or severing operations. Means is provided whereby particles which are within a predetermined size range pass out of the machine so that the machine yields de-vulcanised elastomeric particles of substantially uniform size suitable for subsequent use in a new product, e.g. as an additive to the compound prepared for moulding a new pneumatic tyre.

Preferred embodiments of the invention will now be described with reference to the accompanying diagrammatic drawings, in which:

FIG. 1 is a block diagram showing the alternative routing of pneumatic tyres through plant for the recovery of vulcanised natural or synthetic rubber therefrom;

FIGS. 4 and 5 illustrate alternative apparatus for carrying out the parting step at the station A in FIG. 1;

Figure 3:
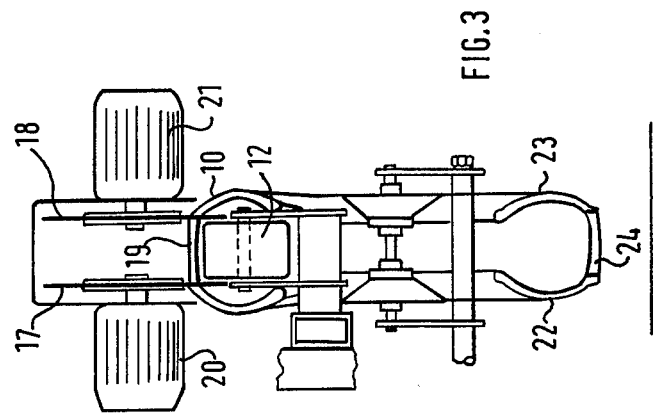
FIGS. 2 and 3 are respectively a side view, and a front elevational view of apparatus for parting the sidewalls from the tread portion of a pneumatic tyre, this apparatus occupying the position indicated at A in FIG. 1.
Figure 2:
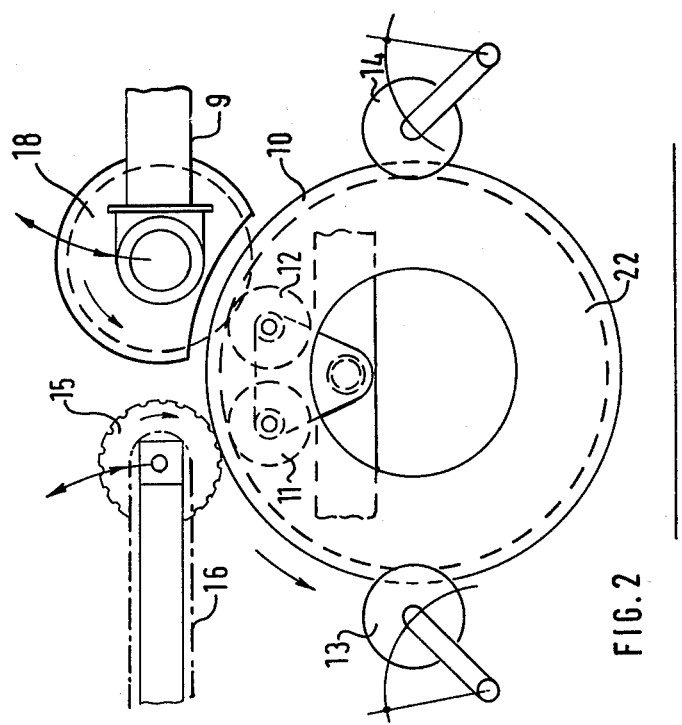

At station A in FIG. 1 pneumatic tyres are parted either by the apparatus shown in FIGS. 2 and 3 or by the apparatus shown in FIGS. 4 and 5 depending upon their type, but in all cases the sidewalls of the tyre are parted from the tread porton on opposite sides of the breaker structure reinforcing the thread portion of the tyre so that this does not have to be cut by the parting tools.

In the case of tyres the sidewalls of which are reinforced by plies of a textile material the parting apparatus of FIGS. 2 and 3 is used. The tyre 10 to be cut is internally supported by rollers 11 and 12 and externally supported by guide rollers 13 and 14 while it is rotated about its axis in the direction of the arrow in FIG. 2 by a sprocket-like drive wheel 15 driven by a chain 16. As the tyre 10 is rotated a pair of spaced-apart abrasive discs 17 and 18 are moved on a lifting frame 9 into contact with the tyre on opposite sides of the breaker structure 19 which reinforces its tread portion. Adjacent the internal rollers 11 and 12 the bead formations of the tyre 10 are splayed apart by powered rollers (not shown). The discs 17 and 18 are respectively driven by electric motors 20 and 21 and penetrate the tyre as it rotates so as to part the sidewalls 22 and 23 of the tyre from its tread portion 24 incorporating the breaker structure 19. Preferably the direction of rotation of the wheel 15 is such as to rotate the tyre 10 in the direction of the arrow in FIG. 2 so that the tyre is in tension when cut by the discs 17, 18.

If the tyre to be parted is of the kind having sidewalls reinforced with wire plies the apparatus shown in FIGS. 4 and 5 may be used. Here the tyre 25 is internally supported by spaced-apart discs 26 and 27, and means (not shown) is provided to spread apart the beads adjacent the discs 26 and 27. The tyre mounted on the discs 26 and 27 is rotated by a drive wheel 30 the toothed periphery 31 of which makes frictional engagement with the tread of the tyre and which is also provided with electro-magnets 32 which help to hold the drive wheel 30 in engagement with the tyre tread by attracting the metal breaker structure 33 embedded in the tyre tread portion. Spaced apart upper discs 34 and 35 are mounted on a frame 36 to be driven by a motor 37 via a gear train 38 and the frame 36 is movable on a column 40 radially with respect to the mounted tyre 25 so that the upper discs 34 and 35 can be brought into engagement with the tyre on opposite sides of the breaker structure 33 in the tread portion 39 of the tyre.

Each upper disc 34 and 35 is aligned with a respective lower disc 26 or 27 and it wil be noted that the peripheries of the discs are chamfered so that co-operating discs 34 and 26 or 35 and 27 have a scissor action upon the tyre sidewall portion between them so as to cut through the rubber and also the wire ply 41 embedded in the sidewalls 43 and 44.

Figure 6:
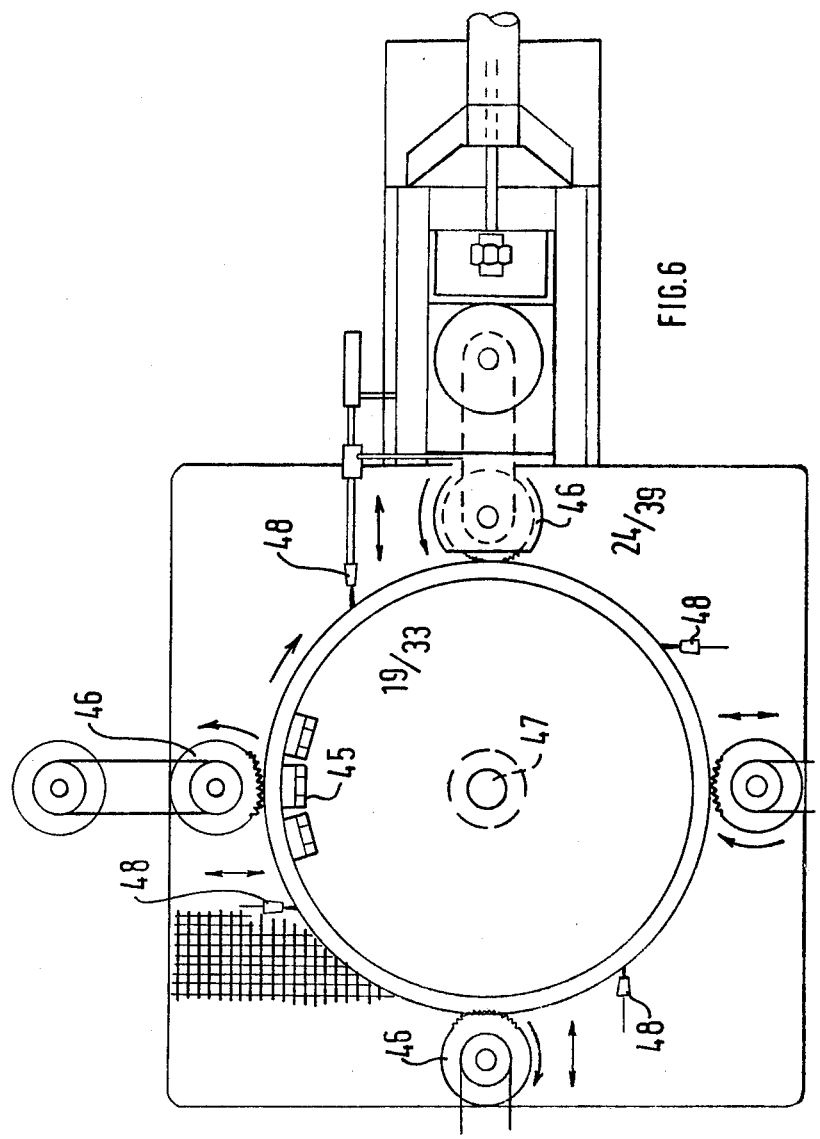
FIG. 6 is a side elevational view of apparatus for recovering rubber from the tread band of a tyre parted at A in FIG. 1, the apparatus of FIG. 6 occupying the position indicated at B or C in FIG. 1.

The tread band parted from the sidewalls of a tyre by the apparatus of FIGS. 2 and 3 or FIGS. 4 and 5 is now mounted on the apparatus shown in FIG. 6, being supported by a radially expandable circular array of permanent or electromagnets 45. Assuming the tread band 24 or 39 to be metallic it will be attracted by magnets 45 to reinforce the tendency of the expanded array to hold the tread band 24 or 39 against relative rotation. At circumferentially spaced positions around the tread band its outer periphery is engaged by cylindrical tools 46 each of which has a periphery formed with sawtooth shaped teeth arranged so that the side of each tooth which is less inclined to the radial of the cutting tool 46 engages the rubber of the tread band 24/39 with a chopping or cutting action as the tread band is rotated on the magnets 45 by jointly rotating the magnets about a common axis 47. The tread band 24/39 is rotated at a relatively low speed, say 20 revolutions per minute, and each of the tools 46 at a relatively high speed so that natural or synthetic rubber is separated in the form of fine particles from the tread band. Fine enough particles obtained by the procedure so far described can be used without further treatment e.g. as an additive to fresh rubber compound, such fine particulate rubber being known when obtained by conventional processes as "rubber crumb". Apparatus having only the elements so far described is located at C in FIG. 1. However to obtain particulate natural or synthetic rubber in which at least most of the rubber is devulcanised (location B in FIG. 1) the apparatus of FIG. 6 additionally incorporates a plurality of oxypropane burner nozzles 48 each of which is elongated axially of the tread band 24/39 so as to play on its outer periphery a narrow flame slightly longer than the axial width of the tread band. Each burner nozzle 48 is located in advance of one of the cutting tools 46 in the direction of rotation of the tread band 24/39 indicated by the arrow in FIG. 6 so that the tread rubber is briefly subjected to a temperature of the order of 2500° C. before being attacked by the teeth of one of the cutting tools. The following cutting tool 46 cuts from the tread band 24/39 particles of the rubber which has been heat treated and therefore produces fine particles of rubber at least the greater part of which has been devulcanised by the heat treatment. It will be seen that as the tread band 24/39 rotates the same point on its periphery is repeatedly heated and then cut so that rubber is progressively removed until the cutters approach the breaker structure 19/33 whereupon the procedure is stopped before the teeth of the cutters can be damaged by the breaker structure.

Although FIG. 6 shows the use of a plurality of burner nozzles 48 and a plurality of cutting tools 46 only one of each of these needs to be used. It will also be appreciated that a whole tyre could be subjected to the heating and cutting procedure instead of the tread band parted from a tyre shown in FIG. 6. A whole tyre suitably supported for rotation about its axis may have tread rubber removed by a cutter such as a cutter 46 and a burner nozzle such as 48 may optionally be provided in advance of the cutting tool in the direction of rotation of the tyre.

Use of the burner nozzles 48 in association with the cutting tools 46 leads to the production not merely of fine particulate rubber but of such particulate material in which substantially the whole of at least most of the particles are in a devulcanised condition (station B FIG. 1). This material can form at least the greater part of a compound which will subsequently be worked, extruded and revulcanised to produce a new article or such devulcanised particulate material will provide a relatively high quality additive for fresh natural or synthetic rubber compound.

Figure 7:
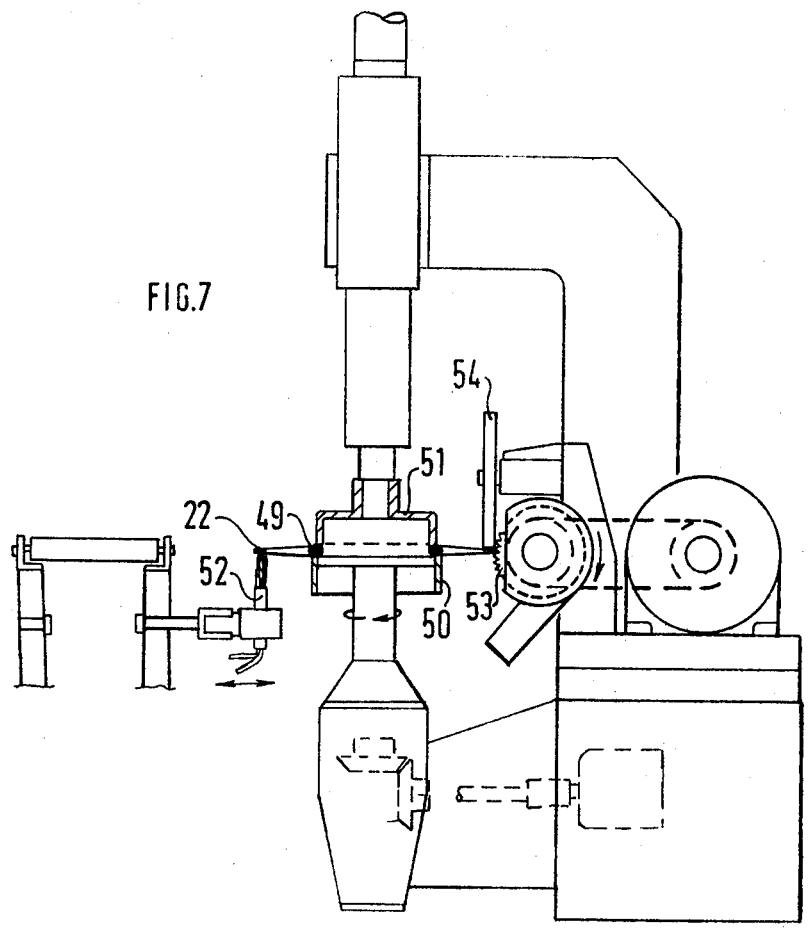
FIGS. 7 and 8 are views of alternative apparatus for occupying the position indicated at D in FIG. 1, the choice being determined by whether the tyre parted at A in FIG. 1 is one with fabric reinforced sidewalls or one with wire reinforced sidewalls.

If the tyre is of the type having textile reinforced sidewalls 22, 23 which have been parted by the apparatus of FIGS. 2 and 3 the rubber of the sidewalls may be recovered by the apparatus shown in FIG. 7 (station D in FIG. 1). In this apparatus the sidewall disc such as 22 has its bead formation 49 clamped betweend upper and lower cylindrical members 50 and 51 by which the disc 22 is rotated. An oxypropane burner 52 is arranged to play its flame on the outer periphery of the disc 22 and at a circumferentially spaced position from the burner 52 a cylindrical cutting tool 53 resembling the cutting tool 46 of FIG. 4 is arranged to attack the periphery of the disc 22. The tool 53 rotates about an axis perpendicular to the axis of the disc 22 in the direction indicated by the arrow and a roller 54 is arranged to ride on the surface of the disc 22 remote from the one attacked by the teeth of the cutter 53 to prevent deflection of the periphery of the disc 22 by the cutter.

The burner 52 and cutter 53 and associated roller 54 are arranged to move progressively radially inwardly of the mounted disc 22 while the disc 22 is rotated relatively slowly and the cutting tool 53 relatively fast. The effect of this arrangement is that the periphery of the disc 22 is first heat treated by the burner 52 and then eaten away by the cutting tool 53 to produce particles in which the natural or synthetic rubber of the sidewall disc 22 is substantially devulcanised. The textile reinforcement embedded in the rubber of the sidewall disc 22 is burnt by the flame from the burner 52 and remains as a soot residue in the particulate material obtained. This soot residue is acceptable in the product as an additive for fresh compound.

Figure 8:
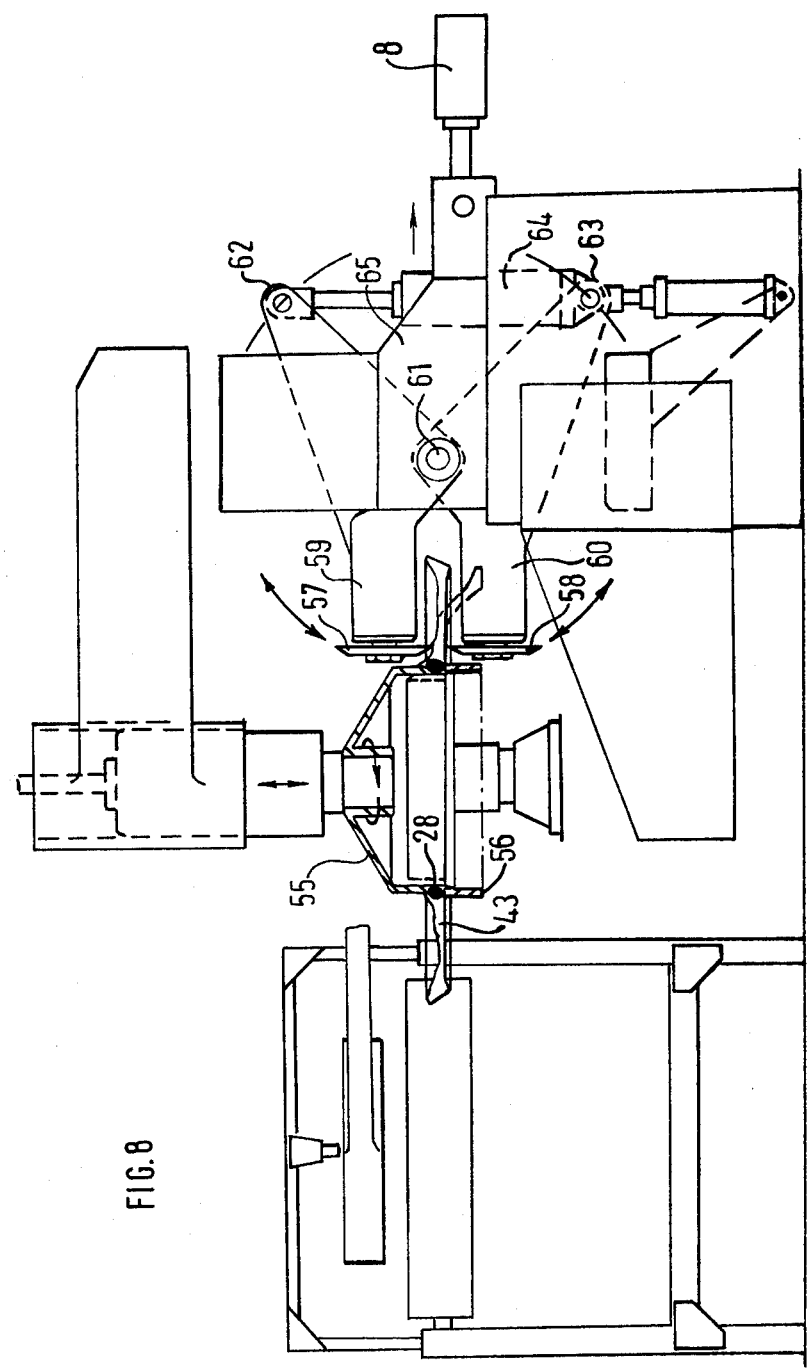

If the tyre parted at Station A in FIG. 1 is of the kind having wire reinforced sidewalls (FIGS. 4 and 5) the rubber of the sidewalls 42 and 43 may be recovered by the apparatus shown in FIG. 8. Here a parted sidewall disc such as 43 has its bead formation 28 gripped between upper and lower cylindrical members 55 and 56 arranged to rotate at e.g. 700 r.p.m. Upper and lower cutter discs 57 and 58 are rotatably mounted on respective arms 59 and 60 which are pivotally interconnected at 61 so that when their rear ends 62 and 63 are moved apart or together by pneumatic or hydraulic ram means 64 the cutters 57 and 28 are arcuately moved together or apart in the manner of scissors. The arms 59 and 60 and ram means 64 are jointly mounted on a carriage 65 arranged to be moved by pneumatic or hydraulic ram means 8 in a plane parallel with that in which the disc 43 is held. The cutters 57 and 58 are moved together on opposite sides of the disc 43 close to the gripped bead reinforcement 28 and the members 55 and 56 are rotated so that the cutters 57, 58 sever the two layers of rubber from opposite sides of the radial reinforcement wires from the rubber surrounding the bead 28. When subsequently the arms 59 and 60 are jointly moved radially away from the disc-clamping elements 55 and 56 the two rubber annuli on opposite sides of the sidewall disc 43 are pulled off over the severed ends of the wire ply in the form of random sized pieces. The scissor-like arcuate movement of the arms 59 and 60 and the advancement and retraction of the carriage 65 can be repeated while the disc 43 is rotated by rotation of the clamping elements 55 and 56 until substantially the whole of the rubber of the disc 43 separated from the bead 28 has been removed.

Figure 9:
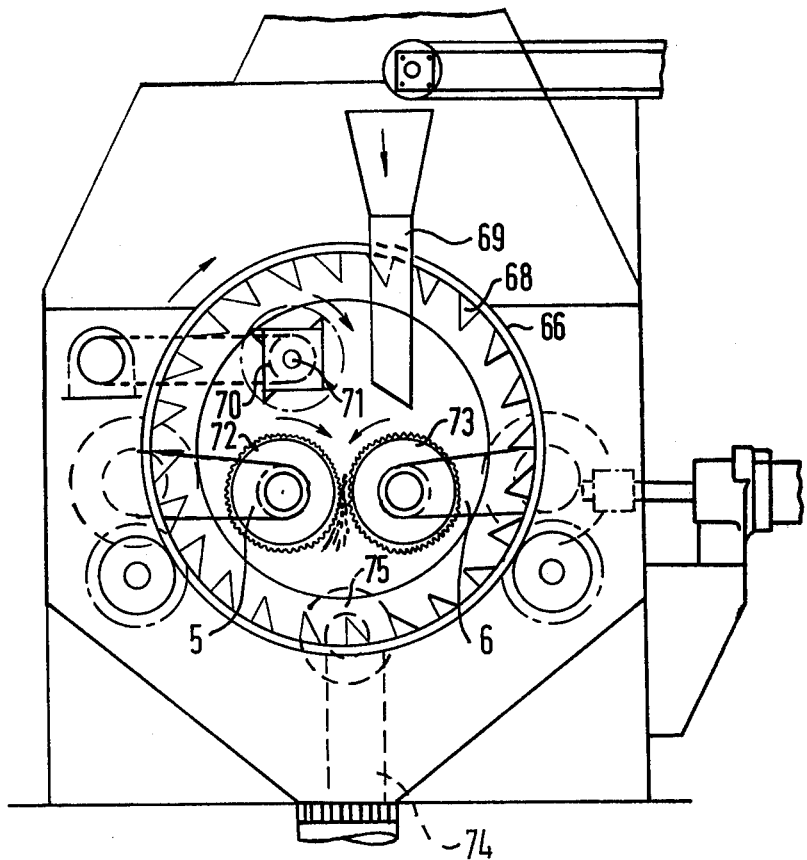
FIG. 9 illustrates apparatus positioned at E in FIG. 1.

FIG. 9 illustrates apparatus which is primarily intended for receiving batches of random sized pieces of vulcanised rubber from the apparatus of FIG. 8 and for converting such material into fine, devulcanised particles but the machine of FIG. 9 can also be used to devulcanise rubber particles which have not previously been heat treated, and to reduce the size of particulate material. As shown in FIG. 1, the machine of FIG. 9 which is located at station E may receive both tread rubber and sidewall rubber simultaneously.

The machine of FIG. 9 comprises a cylindrical drum 66 the ends of which are closed. The internal cylindrical surface of the drum is provided with scoops 68 whereby a batch of material introduced into the drum via a funnel 69 is repeatedly carried to the upper region of the drum to drop back to its lower region.

Positioned in the upper region of the interior of the drum where material will fall onto it from the scoops 68 is a flat sided metal box 70 arranged to rotate about its axis and surrounding an oxypropane burner nozzle. Arranged in the lower region of the drum are two cylindrical cutting tools 72 and 73 having toothed peripheries similar to those of the cutting tools 46 of FIG. 6 or the cutting tool 53 of FIG. 7. These are arranged to counter-rotate at different speeds in the directions indicated by the arrows while at the same time moving progressively toward one another in the horizontal plane, by the progressive angular displacement of arms 5 and 6 on which they are mounted. For example the cutter 72 may rotate at a speed of 1500–300 r.p.m. and the cutter 73 at a speed of less than 200 r.p.m., both cutters 72 and 73 being approximately 9 inches in diameter.

Material introduced into the drum 66 through the funnel 69 falls to the bottom of the drum and is carried upward by the scoops 68 until it falls from them onto the box 70. The flat sides of the latter ensure that the material remains in contact with the box for a period the duration of which can be controlled by varying the rate of rotation of the box about its axis. Preferably the box, which is of a suitable material such as tungsten to withstand the high temperatures involved, is heated by the internal burner 71 to a temperature in the range 2000° to 3000° C. and the rate of rotation of the box 70 about its axis is such that material falling onto the box from the scoops 68 remains in contact therewith for approximately one-tenth of a second before falling into the nip between the cutters 72 and 73. The chopping or cutting action of the cutters 72 and 73 has the effect of removing shreds or particles from the heat treated surface of a piece of rubber dropped from the box 70 and these drop below the cutters 72 and 73 to the bottom of the drum. The progressive movement of the cutters 72 and 73 toward one another ensures that pieces repeatedly passed between them are progressively reduced in size until eventually all the material introduced into the drum is converted into devulcanised particles within a desired size range.

If necessary the pair of cutters 72 and 73 may be supplemented by an additional pair or pairs positioned below them, the material passing from the nip of one pair to the nip of the pair below to achieve progressive reduction of the article.

Adjacent the lower region of the drum 66 is a suction device 74 arranged and adapted to withdraw particulate rubber from the interior of the drum when a window 75 in the drum is registered with the inlet of the suction device and the latter is actuated. A batch of material introduced through the funnel 69 is treated until all of it is of the desired particle size, after which the suction device 74 is activated to remove the treated batch and a fresh batch is introduced.

Alternatively the suction device 74 may be dispensed with, and the drum may be given a foraminous periphery (not shown) which will sieve out particles of the required size as they are produced.

The individual items of equipment illustrated in FIGS. 2 to 9 can be combined in the manner described or can be used individually. For example, the machine shown in FIG. 9 can be used to reduce to devulcanised particles of a predetermined size range pieces or particles of vulcanised rubber obtained from scrap pneumatic tyres by procedures other than those described, or obtained from scrap articles other than pneumatic tyres. Laid out as shown in FIG. 1 the individual items of equipment in FIGS. 2 to 9 provide reclaim plant for pneumatic tyres the sidewalls of which are reinforced either with textile or with wire plies.

Having now described my invention — what I claim is:

1. A method for the recovery for re-use of vulcanised elastomeric material from a surface of an article comprising said material, comprising raising the temperature of the surface to a degree and for a period of time to devulcanise only the surface of the article and subsequently removing the devulcanised material from said surface.

2. A method as claimed in claim 1, wherein the temperature of the surface is raised by a relatively moving source of heat.

3. A method as claimed in claim 2 wherein said source of heat is a naked, oxygen-enriched flame.

4. A method as claimed in claim 2 wherein said source of heat is a metal shield contacted to said surface and receiving heat from an oxygen-enriched flame.

5. A method as claimed in claim 1 wherein said article is a tread band of a pneumatic tyre produced by previously parting a pneumatic tyre on opposite sides of the breaker structure thereof.

6. A method for the recovery for re-use of vulcanised elastomeric material from a surface of an article comprising said material, comprising raising said surface to a temperature in the range 2000°–3000° C. for a period of less than ½ second and subsequently removing heat treated elastomeric material from said surface, the heat treated elastomeric material being removed in the form of discrete particles by applying to the heat treated surface a tool which has a rasping action on said surface.

7. A method as claimed in claim 6 wherein the surface is raised to a temperature of approximately 2500° C. for a period of approximately one-tenth of a second.

8. A method for the recovery for re-use of vulcanised elastomeric material from a surface of an article comprising said material, comprising briefly raising said surface to a high temperature and subsequently removing heat treated elastomeric material from said surface, the temperature of said surface being raised by a relatively moving source of heat which speed of said relative movement is in the range 120–130 feet per minute.

9. A method for the recovery for re-use of vulcanised elastomeric material from surfaces of an article comprising said material, comprising raising said surfaces to a high temperature and subsequently removing heated elastomeric material from said surfaces, the heat treated elastomeric being removed in the form of discrete particles by passing the heat treated surfaces into the nip between two similar tools each of which has a rasping action on one of said surfaces.

10. A method as claimed in claim 9, wherein the said tools are counter-rotated at different speeds.

11. A method as claimed in claim 10 wherein the said tools are progressively advanced toward one another while said article is repeatedly passed between them, the sequence of subjecting the article to heat treatment and to the action of said tools being repeated until substantially the whole of the article is reduced to de-vulcanised particles within a predetermined size range.

12. A method as claimed in claim 10 wherein the said article is a piece of a pneumatic tyre.

13. A method for the recovery for re-use of vulcanised elastomeric material from an outer surface of a tread band comprising heating the outer surface of a rotating tread band from a source of heat positioned radially of the tyre and removing the heat treated elastomeric material from the outer surface of the tread band by a rotating rasping tool which is advanced into contact with the outer surface of the tread band at a position spaced circumferentially of the tread band from the source of heat in the direction of rotation of the tread band.

14. A method for the recovery of vulcanised natural or synthetic rubber from a scrap pneumatic tyre the method comprising initially parting the sidewalls from the tread portion on opposite sides of the breaker structure thereby severing from the latter the sidewall ply, mounting the tread band thus obtained to rotate about its axis while subjecting its outer periphery in sequence to a flame and to the action of a rasping tool, and recovering natural or synthetic rubber from the parted sidewalls in a separate operation.

15. A method as claimed in claim 14 for the recovery of vulcanised natural or synthetic rubber from a scrap pneumatic tyre of the kind having sidewalls reinforced by textile plies, the method additionally comprising gripping each parted sidewall by the bead formation thereof, applying heat to the periphery of the sidewall so that a given point on the periphery of the sidewall is briefly raised to a high temperature and subsequently attacking the heat-treated periphery of the sidewall with a rasping tool so as progressively to reduce the material of the sidewall from its periphery toward the bead formation into discrete, heat-treated particles.

16. A method as claimed in claim 14 for the recovery of vulcanised or synthetic rubber from a scrap pneumatic tyre of the kind which has a steel-reinforced breaker structure in the tread portion and a steel ply in the sidewalls extending between the respective bead reinforcements of the sidewalls, wherein the steel ply is severed adjacent the breaker structure in parting the sidewalls from the tread portion.

17. A method as claimed in claim 16 and comprising gripping the bead reinforcement of each parted sidewall to prevent movement of the severed sidewall ply extending therefrom and pulling natural or synthetic rubber off the sidewall over the severed ends of the ply.

18. A method for the recovery for re-use of vulcanised elastomeric material from a surface of an article comprising said material, comprising raising the temperature of the surface to a degree and for a period of time to de-vulcanise only the surface of the article and subsequently removing the devulcanised material from said surface, the devulcanised material being removed in the form of discrete particles by applying to the heat treated surface a tool which has a rasping action on said surface.

* * * * *